May 18, 1937. H. A. KAST 2,081,118
METHOD OF CONTINUOUSLY MANUFACTURING HYDROCHLORIC ACID
Filed June 8, 1933
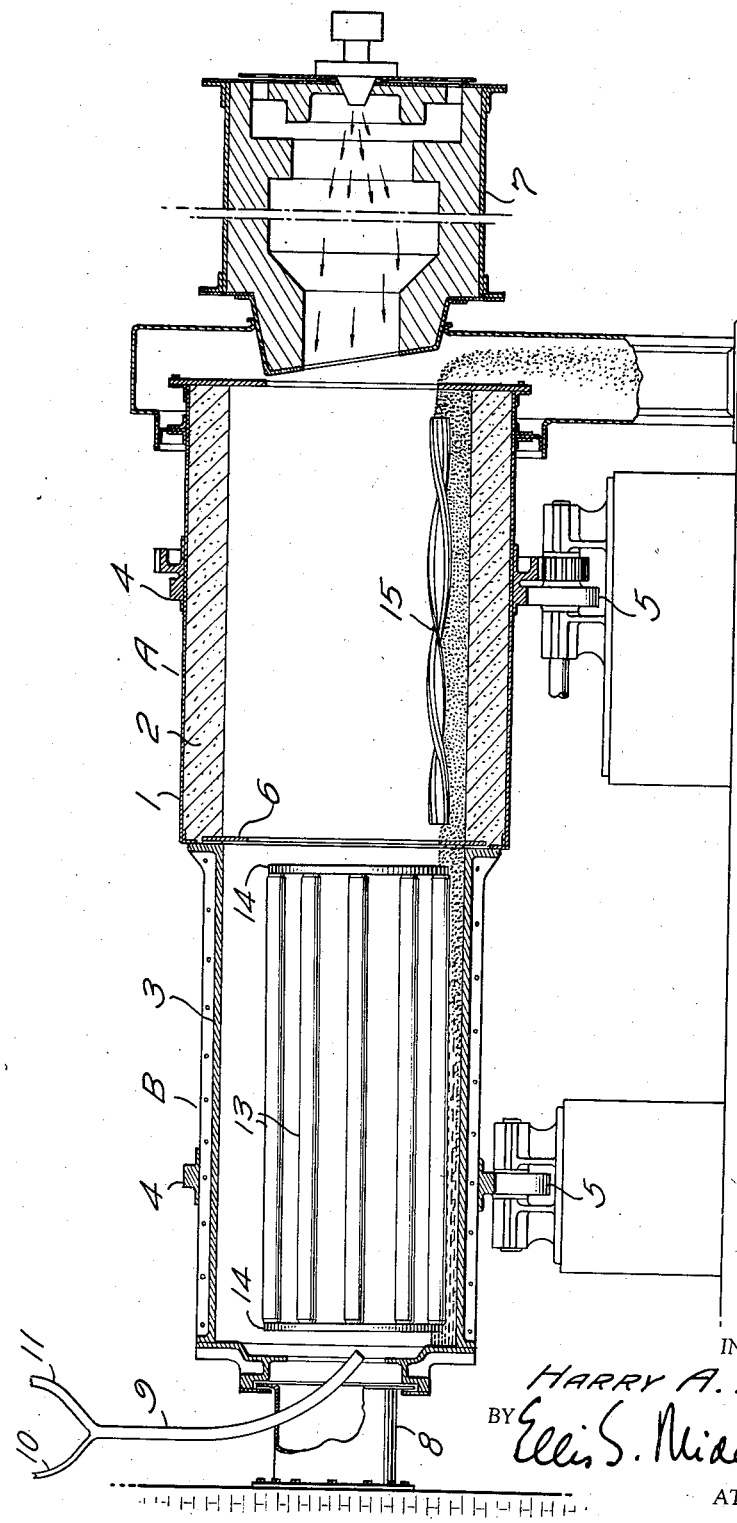
INVENTOR.
HARRY A. KAST,
BY Ellis S. Middleton
ATTORNEY.

Patented May 18, 1937

2,081,118

UNITED STATES PATENT OFFICE 2,081,118

METHOD OF CONTINUOUSLY MANUFACTURING HYDROCHLORIC ACID

Harry A. Kast, Cranford, N. J., assignor to American Cyanamid Company, New York, N. Y., a corporation of Maine Application June 8, 1933, Serial No. 674,810

15 Claims. (Cl. 23—155)

The present invention relates to a method of continuously manufacturing hydrochloric acid in furnaces of the rotary type from sulphuric acid and salt.

It is the principal object of this invention to eliminate the difficulties naturally attendant upon batch procedures, and likewise to make unnecessary any prior operations such as the preparation of niter cake as one of the ingredients. In other words, one of the prime objects of the invention is to continuously produce hydrochloric acid from salt and sulphuric acid in a rotary furnace by a direct one step process.

In extensive experiments along this line it has been discovered that the strength of the acid is critical. It has been proved that such operations cannot continue uninterruptedly with efficient results where the sulphuric acid is less than 95% strength. Where a strength of 95% or greater is used, however, and the salt and acid are continuously fed to the heated reaction zone, the reaction proceeds efficiently to approximate completion without untoward incidents, with maximum hydrochloric acid production and with minimum unreacted materials remaining in the solid reaction product. It is preferable that the acid used be of 98 to 100% strength as the best results have been secured by the use of acid of this concentration.

As an apparatus for carrying out the preferred procedure, it has been found most efficacious to use a rotary furnace, the reactants being continuously fed into the cooler end thereof while the solid reaction product is continuously discharged from the hotter end. The furnace is preferably heated interiorly by the direct heat of gases discharged thereinto and axially thereof. Combustion gases have been found to be eminently satisfactory for this purpose. The reactants, therefore, pass countercurrent to the flow of heated gases and the latter sweep the generated hydrochloric acid out of the furnace into suitable recovery devices, with which this invention is not here concerned.

In operating a furnace of the above description, it has been found desirable to maintain a reaction zone therein of just below the fusing point of salt cake at the salt cake discharge end to say 600° F. at the hydrochloric acid take off end. The sulphuric acid and sodium chloride are continuously fed into the reaction zone at the cooler end in approximately the proportion of 98 lbs. of 98% acid to 120 lbs. of salt. This ratio of feed is maintained in a continuous manner and upon passing through the furnace the well known reaction occurs with generation of hydrochloric acid which is swept out of the reaction chamber by the on-coming heated gases and suitably recovered. Salt cake in a substantially dry and pulverulent condition is discharged from the hotter end of the furnace at approximately a temperature of 1200° F., in a high state of purity.

The invention further consists in the novel arrangement, combination and construction of parts and in the operation of the process as hereinafter more fully described.

In the drawing, the figure illustrates diagrammatically a furnace for carrying out the process of this invention.

Referring now with particularity to the drawing, a rotary furnace is shown having sections A and B in which the section A is provided with a steel shell 1 lined with refractory material 2 such as firebrick or the like, and suitably joined to the cast iron shell 3 constituting the section B. The joined sections A and B are provided with tracks 4 carried on rollers 5 which support the furnace for rotation by any suitable means, not shown.

It is desirable that between the sections A and B a baffle wall 6 be provided which will maintain a level of reactant material within the section B until it is in the proper condition to pass from the section B to the section A.

At the hotter end of the furnace a heated gas conduit 7 is provided through which heated gases are supplied. These gases may conveniently come from a source of combustion such as an oil burner or the like at the requisite temperature to produce the desired degree of heat within the furnace. The conduit 7 is suitably spaced from the lining 2 of the section A in order to permit the discharge of the solid reaction product therebetween.

At the colder end of the furnace a take-off 8 is provided through which the hydrochloric acid, moisture and combustion gases pass from the furnace to a suitable hydrochloric acid recovery system, not shown, and to which no claim is here made as this is a well known procedure. The take-off 8 is immovably fixed with regard to the rotating furnace, but so arranged that the escape of gaseous materials is reduced to a minimum.

Sulphuric acid is fed into the conducting tube 9 through the medium of the branch pipe 10 and into the cooler end of the furnace, while the sodium chloride or salt is supplied through the branch pipe 11.

In order to insure thorough agitation and mixing of the ingredients at the initial start of their passage through the reaction zone, a cage or the like may be provided in the section B which may conveniently consist of rods or bars 13 bolted or otherwise secured to rings 14 with some clearance between the outer dimensions of the cage and the wall of the shell 3. As the furnace rotates the cage likewise rotates and has a tendency to prevent lumping and ringing of the reactants as they pass toward the hotter end of the reaction zone. A twisted rail or the like 15 is likewise provided in section A to prevent caking and assist in the continuous discharge of the pulverulent salt cake.

In operation, sulphuric acid of a strength not less than 95%, and preferably 98 to 100%, is continuously fed through the branch pipe 10 simultaneously with a feed of sodium chloride through the pipe 11. It has been found desirable to maintain a ratio of approximately 98 lbs. of 98% acid to each 120 lbs. of salt. While this ratio may be varied within reasonable limits, yet for most satisfactory results it should be maintained fairly uniformly.

The supply of heated gases should be such as to maintain a temperature range within the furnace from approximately 2000° F. at the hotter end to 600° F. at the reactants entrance end. As the acid and salt are fed to the cooler end of the furnace, they are intimately mixed due to the rotating action of the furnace and the auxiliary action of the cage, and a reaction begins immediately. As the hydrochloric acid is generated it is swept out of the furnace through the take-off 8 and recovered in any suitable manner. The reactants continuing in their passage toward the hotter end of the furnace are held back by the dam or baffle 6 to prevent a too rapid flow through the furnace, spill over the top thereof, and the reaction proceeds under the increasing temperature to practical completion. The resultant salt cake, as a substantially dry and pulverulent solid, discharges from the furnace and may be caught and recovered in any suitable type of apparatus.

Operation over a long period of time under these conditions has shown that as long as the sulphuric acid is maintained not less than 95%, no ringing or balling occurs within the furnace. While there is some tendency at 95%, this tendency decreases rapidly as the concentration approaches 100%. Below 95% the process becomes commercially inoperative, and at best the furnace must be intermittently stopped to dig out the cake before operations can be continued.

Under the operations above set forth using the critical concentration of acid, salt cake has been continuously produced containing less than 1% acid and less than .5% salt.

While the invention has been shown and described with particular reference to a preferred system of operation, yet obviously the invention is not to be restricted thereto but should be construed broadly and limited only by the scope of the claims.

I claim:

1. A continuous method of generating hydrochloric acid which includes the step of continuously feeding salt and sulphuric acid of a strength of 95% or greater to a rotating heated reaction zone, and continuously withdrawing hydrochloric acid therefrom.

2. The method of claim 1 in which the reaction zone is heated by direct heat.

3. The method of claim 1 in which the reaction zone is directly heated by combustion gases.

4. The method of claim 1 in which the reactants are subjected to constant agitation.

5. A continuous method of generating hydrochloric acid which includes the step of continuously feeding salt and sulphuric acid of a strength of 96% or greater to a rotating heated reaction zone and continuously withdrawing hydrochloric acid therefrom.

6. A continuous method of generating hydrochloric acid which includes the step of continuously feeding salt and sulphuric acid of a strength of 97% or greater to a rotating heated reaction zone and continuously withdrawing hydrochloric acid therefrom.

7. A continuous method of generating hydrochloric acid which includes the step of continuously feeding salt and sulphuric acid of a strength of 98% or greater to a rotating heated reaction zone and continuously withdrawing hydrochloric acid therefrom.

8. A continuous method of generating hydrochloric acid which includes the step of continuously feeding salt and sulphuric acid of a strength of 99% or greater to a rotating heated reaction zone and continuously withdrawing hydrochloric acid therefrom.

9. A continuous method of generating hydrochloric acid which comprises introducing sodium chloride and sulphuric acid of 95% strength or greater to a rotating heated reaction zone, passing said reactants and resultant solid and liquid reaction products through a zone of progressively increasing temperature countercurrent to a stream of heated gases, and continuously removing the hydrochloric acid from said zone.

10. The method of claim 9 in which said heated gases are combustion gases.

11. A continuous method of generating hydrochloric acid which comprises introducing sodium chloride and sulphuric acid of 95% or greater strength to a rotating heated reaction zone, passing said reactants and resultant solid reaction products through a zone of progressively increasing temperature countercurrent to a stream of heated gases, and continuously removing the hydrochloric acid from said zone, the reactants being subjected to heat at such a temperature and for such a length of time that a dry, pulverulent salt cake is produced.

12. A continuous method of generating hydrochloric acid which comprises introducing sodium chloride and sulphuric acid of 95% strength or greater to a rotating heated reaction zone, passing said reactants and resultant solid reaction products through a zone of progressively increasing temperature countercurrent to a stream of heated gases, and continuously removing the hydrochloric acid from said zone, and continuously withdrawing the solid products of the reaction from the opposite end of the zone.

13. The method of claim 9 in which the temperature range of the reaction zone is approximately from 600° to 2000° F.

14. A continuous method of generating hydrochloric acid which comprises introducing sodium chloride and sulphuric acid of 95% strength or greater to a rotating heated reaction zone, passing said reactants and resultant solid reaction products through a zone of progressively increasing temperature countercurrent to a stream of heated gases, and continuously removing the hydrochloric acid from said zone, and continuously withdrawing the solid products of the reaction from the opposite end of the zone, the solid product being discharged at substantially 1200° F.

15. The method of claim 1 in which the feed ratio is approximately 120 lbs. of salt to each equivalent 98 lbs. of 98% acid.

HARRY A. KAST.